Patented Feb. 26, 1935

1,992,488

UNITED STATES PATENT OFFICE 1,992,488

STONE-LIKE STRUCTURAL MATERIAL

Paul W. Jones, La Fayette, Ind., assignor to Rostone, Incorporated, La Fayette, Ind., a corporation of Indiana No Drawing. Application September 19, 1932,
Serial No. 633,924

6 Claims. (Cl. 18—47.5)

This invention relates to a novel stone-like structural material and includes the product obtained and the process of making same.

I have discovered that a reaction of a mixture of alkaline earth carbonates and alkaline earth bases when subjected to moist heat effects a change in the chemical or physical state of the materials which results in a product possessing excellent strength and other useful physical properties rendering it suitable for structural purposes.

In accordance with my invention or discovery I intimately mix finely divided limestone or dolomite with an alkaline earth base, such as lime hydrate, and sufficient water to form a fairly compact thoroughly wetted mass; which mass is then molded into shapes and indurated by subjecting same to moist heat in an oven or container until the desired reaction occurs.

Very fine limestone and dolomite wastes occur in quarries and mills where the natural stone is sawed and finished. These fine wastes can be utilized in my process, or larger sized waste pieces may be pulverized to suitable fineness.

Since my product is a result of chemical union or physical change, the raw material must be finely divided and most of it should pass a 200 mesh screen: The control of fines is important to the final properties of my product and the completeness of the chemical or physical union. The fine limestone or dolomite and an alkaline earth base (such as lime hydrate) are incorporated thoroughly and completely with sufficient water to insure proper particle contact, which may be accomplished in standard commercial mixing machines. After the ingredients have been thoroughly mixed, the moist material is formed into shapes in molds, or by other suitable means; and such damp molded shapes are then subjected to moist heat in a suitable oven or container until the desired reaction occurs.

In producing my product I employ:

(1) Alkaline earth carbonates, such as limestone, a chemical compound formed by union of a base ($Ca(OH)_2$) and an acid ($H_2CO_3$) $Ca(OH)_2 + H_2CO_3 = CaCO_3 + 2H_2O$, and (2) Alkaline earth bases, such as lime hydrate ($CaOH_2$).

Normally no reaction would be expected between these two materials, cited above. However, I have discovered that something unusual does take place under exposure to moist heat which I tentatively explain on chemical grounds, as: $CaCO_3 + Ca(OH)_2 + nH_2O = CaCO_3, Ca(OH)_2 + xH_2O$.

One specific practical example of my process and product is as follows: 100 parts pulverized limestone, 20 parts lime hydrate, and 15 parts water are intimately mixed to form a workable mass; the mass is then formed into shapes, and the shapes subjected to moist heat in a suitable oven or retort at a temperature of about 320 degrees Fahrenheit for a period of about 2 hours until the desired reaction occurs. The resulting product has a compressive strength of approximately 4000 pounds per sq. in. and has physical properties comparable to those of natural limestone or dolomite. The proportions temperature, and time given above are illustrative and not definitive.

It has heretofore been attempted to produce synthetic stone or building material by subjecting a mixture of limestone and lime hydrate to action of carbonic acid gas. The difference between the induration with $CO_2$ gas and simple moist heat is very great chemically. Indurating with $CO_2$ gas produces a knitting together of the limestone particles by the carbonation of the lime, resulting in a $CaCO_3$ mixture. In my process I presumably obtain by chemical reaction a basic carbonate $CaCO_3$, $Ca(OH)_2$ and produce an essentially different product from that produced by $CO_2$ gas.

My process differs from previous processes in that the reaction occurs between the ingredients during induration in the presence of moist heat; no carbon dioxide gas or the like is used. My product is obtained by compacting the thoroughly mixed ingredients to bring about particle contact and the subsequent induration under controlled moisture and heating conditions.

This product may be used to bind together during the indurating step coarser particles of waste material such as limestone, dolomite, or other aggregates, which causes a resemblance to the natural product itself with similar physical properties, texture, and appearance.

I claim:—

1. The herein described process of producing structural material, consisting in intimately mixing a finely divided alkaline earth carbonate and an alkaline earth base, moistening same, shaping the mass and subjecting the shapes to moist heat until they are converted into the desired material.

2. The herein described process of producing a stone-like structural material, consisting in intimately mixing finely divided lime-stone, lime hydrate and sufficient water to thoroughly wet the mass, shaping the mass and indurating the shapes by moist heat until they are converted by reaction into the desired material.

3. The herein described process of producing a stone-like structural material consisting in intimately mixing finely divided dolomite, lime hydrate and sufficient water to thoroughly wet the mass, shaping the mass and indurating the shapes by subjecting them to moist heat until they are converted into the desired material.

4. The herein described structural material produced by intimately mixing a finely divided alkaline earth carbonate and an alkaline earth base, moistening same, shaping the mass and subjecting the shapes to moist heat until they are converted by reaction into the desired material.

5. The herein described stone-like structural material, produced by intimately mixing finely divided lime-stone, lime hydrate and sufficient water to thoroughly wet the mass, shaping the mass and indurating the shapes by moist heat until they are converted into the desired material.

6. The herein described stone-like structural material produced by intimately mixing finely divided dolomite, lime hydrate and sufficient water to thoroughly wet the mass, shaping the mass and indurating the shapes by subjecting them to moist heat until they are converted by reaction into the desired material.

PAUL W. JONES.